Nov. 20, 1934. C. H. LEACH Re. 19,377
REFINING APPARATUS
Original Filed Nov. 10, 1926
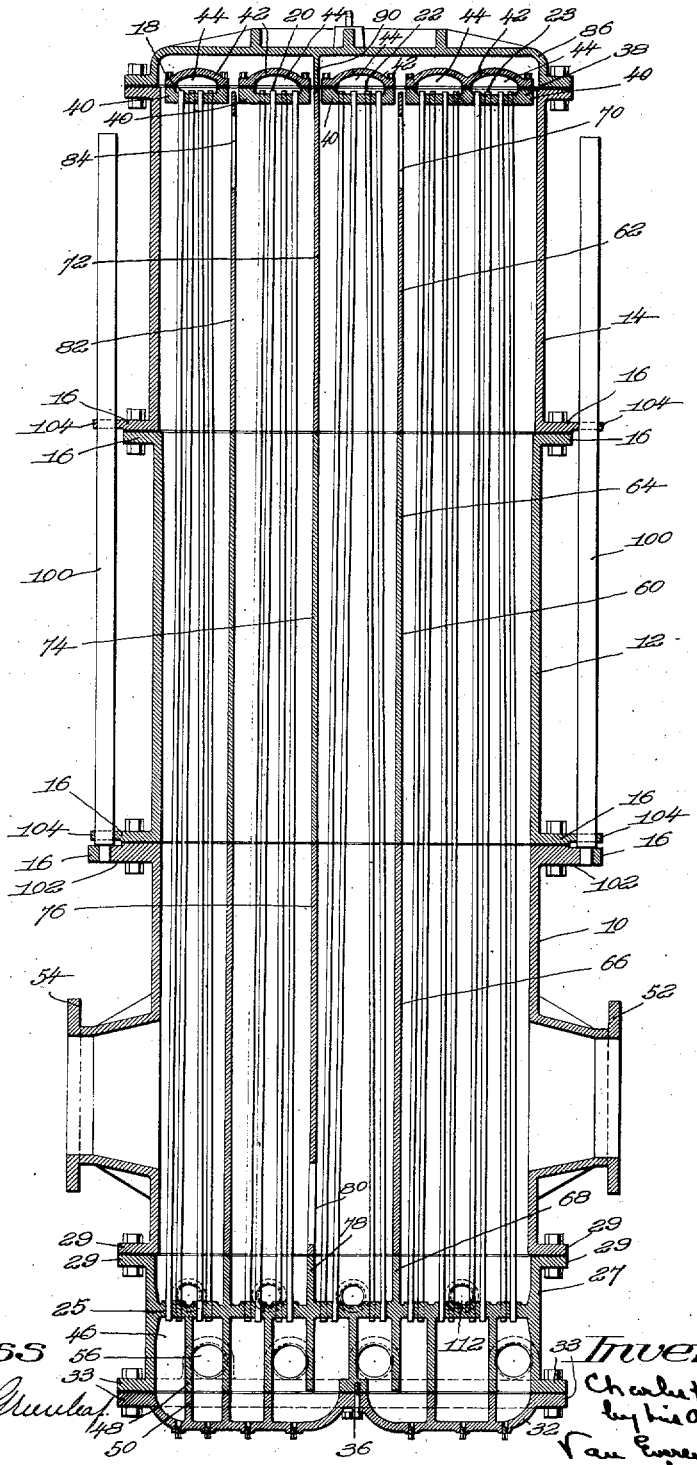
Witness
Frederick S. Grunlaf
Inventor
Charlott H. Leach
by his Attorneys
Van Everen & Fish
Hildreth Kary.

Reissued Nov. 20, 1934 Re. 19,377

UNITED STATES PATENT OFFICE 19,377

REFINING APPARATUS

Charles H. Leach, Roselle, N. J.

Original No. 1,821,346, dated September 1, 1931, Serial No. 147,561, November 10, 1926. Renewed January 28, 1931. Application for reissue August 29, 1933, Serial No. 687,378

10 Claims. (Cl. 257—223)

The present invention relates to apparatus employed in connection with the refining of crude petroleum oil, and more particularly to apparatus of this character employed in connection with the condensation of the hot vapor resulting from the distillation of crude oils.

One object of the present invention is to provide a simple and efficient form of condensing apparatus which permits access to the interior of the shell for the purpose of cleaning the shell and the exterior of the tubes.

With this and other objects in view, one feature of the invention contemplates the provision of a series of banks of condenser tubes mounted within an enclosing shell and provided with a series of vapor passes so designed that the tube bundles may be exposed without disconnecting or otherwise disturbing the interior construction. The invention also contemplates means for facilitating this exposure of the tubes through the provision of means for retaining and guiding the free sections of the shell during the movement of withdrawal.

Still further features of the invention consist in certain novel features of construction, combinations and arrangements of parts hereinafter described and claimed, the advantages of which will be obvious to those skilled in the art from the following description.

The accompanying drawing illustrating the preferred form of the invention represents an elevation partially in section of a condensing apparatus embodying the features of the invention.

The apparatus shown in the illustrated embodiment of the invention comprises a shell consisting of several cast sections indicated respectively at 10, 12 and 14. The sections are provided with connecting flanges 16 which are bolted together to form the completed tubular shell. Enclosed within the shell are a series of banks of condenser or heat exchange tubes, indicated respectively at 18, 20, 22 and 23. The lower ends of all of the tube banks are flanged into a transverse partition 25 which forms an integral part of a tube supporting member in the form of a head casting 27. The head casting 27 is bolted to the lower shell section through flanges 29, and is closed at its lower portion by a detachable cover member 32 rigidly bolted thereto by a flange 33 and an intermediate portion 36. The upper end of each bank of tubes is connected to a floating head, indicated generally at 38. Each floating head comprises a body portion 40 into which the open ends of the tubes are flanged, and a cover member 42 which seals one or more closed chambers 44 communicating with the interior of the tubes. The lower open ends of the tubes communicate with a series of cooling fluid passages or chambers 46 which are formed by ribs 48 depending from the partition 25, as indicated clearly. These ribs cooperate with complementary ribs 50 formed on the cover member 32 in a manner to provide a series of passages for controlling the flow of cooling medium through the interior of the tube banks. The hot vapor is conducted to and from the interior of the enclosing shell through inlet and outlet nozzles 52 and 54, respectively, which are formed upon the lower shell section or vapor nozzle ring 10, as indicated in the drawing. The cooling liquid delivered to the interior of the tube banks through the passages 46 is controlled through a series of inlet and outlet nozzles, a portion of which is indicated at 56. These nozzles, and the liquid passages communicating therewith, are designed to cause an initial flow of cooling liquid upwardly through one-half of the tube bank 18; thereafter the chamber 44 in the floating head redirects the cooling liquid downwardly through the remaining half of the tube bank. This cooling liquid admitted to the last bank of condenser tubes may be water at ordinary tap temperature. The first liquid passage communicating with the next bank of tubes may be connected with cold charge oil, which thereupon flows in a similar manner twice through each tube bank 20 and 22, and lastly four times through the double bank of tubes indicated at 23. The incoming hot vapor conducted to the interior of the shell from the nozzle 52 is directed upwardly about the tube bank 23 by a baffle or partition 60, consisting of a series of sections 62, 64 and 66 connected respectively to each of the shell sections. This baffle is located between the tube banks 22 and 23, and at its lower end engages with a partition 68 projecting upwardly from the transverse partition 25 to form a closed vapor pass at the lower portion of the tube bank 23. The upper end of the baffle 60 is provided with one or more vapor passes or openings 70 formed as indicated in the drawing, in the upper section 62. This baffle also projects upwardly between adjacent floating heads for a purpose to be presently described. The vapor, after its forward passage through the first vapor pass is turned downwardly by a baffle comprising sections 72, 74 and 76 corresponding with each shell section. The lower section of this next baffle contacts with a web or partition 78 and is provided with a vapor opening or pass 80 for directing the vapor at the bottom for the lengthwise traverse into the next adjacent vapor pass. This third vapor pass is formed by a sectional partition, indicated generally at 82, and having an opening 84 at its upper portion. From the top of the last bank of tubes, the vapor passes downwardly and outwardly from the nozzle 54. As also indicated clearly in the drawing, all of the baffles, defining the several vapor passes, extend upwardly between adjacent floating heads, the construction being so designed that withdrawal of the upper shell sections 12 and 14 is permitted, either in whole or in part, without disturbing the tube bundles and floating heads connected thereto. This is conveniently accomplished by disconnecting the flanges between the sections 10 and 12, and then elevating the two upper sections, the upper baffle sections sliding upwardly therewith between adjacent floating heads. Inasmuch as the upper ends of the baffles are permanently positioned between the floating heads, there is no opportunity upon the removal of the shell sections for interference between the upper edges of the baffles and the under side of the floating heads. Furthermore, removal of the shell sections does not require removal or disconnection of the upper cover member 86 which encloses the floating heads. It will be evident that a partial or complete withdrawal from the two upper shell sections exposes two-thirds of the tube length in the interior of the shell in a manner to permit cleaning of the exterior of the tubes or the interior of the shell and the removal of carbon accumulation therefrom. It will be noted that the cover member 86 is provided with a depending web 90 which cooperates with the upper baffle section 72 to completely close the upper end of the vapor pass between the floating heads 20 and 22, and prevent flow of vapor except in a downward direction lengthwise of the tube bundles.

In addition to permitting the withdrawal of the shell sections and cleaning of the tubes, the present construction is designed to safeguard the tubes during the withdrawal of the relatively heavy sections. To this end provision is made for guiding the lower free end of the shell sections until this lower free end has been elevated to a point where opportunity for contact with the tube bundles is prevented. A plurality of guides 100 are rigidly mounted at their lower ends in supports 102 rigidly connected to the flange 16 on the lower shell section 10. Each of these guides is loosely engaged by a ring 104 projecting from each of the upper shell sections in a manner to compel movement of the sections parallel to the tube bundles during withdrawal. It will be evident that these guides are disposed uniformly about the exterior of the shell, and that the employment of the guides, coupled with the baffles or partitions which slide between the floating heads, not only compels movement of the shell sections in a predetermined path but maintains the tube bundles centered with respect thereto. These guides preferably extend upwardly to a point adjacent the floating heads so that complete removal of the shell sections is permitted by elevating the bottom of the section 12 above the top of the guides without liability of the sections engaging with the walls of the tube bundles.

In the operation of the apparatus, condensate formed in each vapor pass is collected in a basin formed at the upper side of the partition 25 and having a condensate bleed or outlet 112 communicating therewith to drain condensate from the collecting basin. It will furthermore be evident from an inspection of the drawing that each basin is provided with one or more gutters, forming in effect raised pads surrounding the lower ends of the tubes and serving to protect the lower ends of the tubes from contact with stagnant pools of liquid condensate which otherwise might exert a severe corrosive action.

It will be evident that the above-described construction results in a maximum of vapor and liquid passages for a given number of tubes, while at the same time permitting bodily withdrawal of the shell and baffle sections forming the vapor passes without interference with the tube bundles themselves.

What is claimed is:

1. The combination, in apparatus having a plurality of banks of tubes with a surrounding shell, with longitudinal partitions connected to the shell to form a series of passes lengthwise of the tubes and disposed in a manner to permit withdrawal of the surrounding shell and connected partitions from about the tube banks without disconnecting the partitions from the shell, and means for guiding and centering the shell with respect to the tube banks during withdrawal.

2. The combination, in apparatus having a plurality of banks of tubes connected at one end to a unitary tube support and at their opposite ends to individual floating heads, with a series of superimposed shell sections each having partition sections connected thereto and disposed between tube banks, the complementary partition sections forming upon assembly of the shell sections a plurality of continuous partitions extending lengthwise between the tube banks, and inlet and outlet nozzles communicating with the space surrounding the tubes.

3. Refining apparatus comprising a plurality of banks of tubes, a shell surrounding the tubes, a series of baffles disposed within the shell and extending through the tubes to form passes lengthwise thereof, and guide members disposed about the exterior of the shell and designed to guide and center the shell upon withdrawal from about the tube banks.

4. Heat exchange apparatus comprising a plurality of banks of tubes, a single head to which one end of all the tubes are connected, a floating head connected to the opposite end of each bank of tubes, a shell surrounding the tubes, a series of baffles connected with the shell and projecting between the floating heads to form a series of vapor passes extending alternately in opposite directions longitudinally of the tube banks, and means for insuring a predetermined relative position of the shell and tube banks upon withdrawal of the shell with relation to the tubes.

5. Heat exchange apparatus comprising a plurality of vertical tubes, a single head to which the one end of each tube is connected, a plurality of floating heads connected to the opposite ends of the tubes, a shell surrounding the tubes, means within the shell for forming a series of passes lengthwise of the tubes, and means for guiding and centering the shell upon withdrawal lengthwise of the tubes.

6. The combination, in apparatus having a plurality of banks of tubes with a surrounding shell, with longitudinal partitions adapted to form a series of passes lengthwise of the tubes and exteriorly thereof, and means for guiding and centering the shell with respect to the tube banks during withdrawal.

7. Heat exchange apparatus comprising a plurality of banks of tubes, a sectional shell surrounding the tubes, means for detachably connecting the sections of the shell in assembled relation, means for closing the shell at opposite ends, inlet and outlet nozzles communicating with the interior of the shell about the tubes, means for forming a series of vapor passes in the interior of the shell, and means for guiding one or more shell sections during withdrawal from about the tubes.

8. Heat exchange apparatus comprising a plurality of tube bundles connected at opposite ends to stationary and floating heads, a shell detachably connected to the stationary head and enclosing the tube bundles and floating heads, a plurality of partitions extending lengthwise of the tube bundles and all located substantially in the planes of division between the floating heads, the partitions being designed to provide a tortuous vapor passage extending lengthwise of the tube bundles alternately in opposite directions and permitting complete removal of the shell from about the tube bundles and floating heads without interference between the partitions and floating heads.

9. Heat exchange apparatus comprising a stationary tube head, a plurality of tube bundles connected to the head, floating heads connected to the opposite ends of the tube bundles, a shell enclosing the space about the tube bundles and floating heads, inlet and outlet vapor nozzles affording communication with the interior of the shell about the tube bundles, a partition extending lengthwise of the tube bundles within the shell for forming a tortuous vapor passage extending lengthwise of the tube bundles, and means for detachably connecting that portion of the shell surrounding the tube bundles and floating heads to the vapor nozzle portion to permit complete withdrawal of the said portion of the shell from about the tube bundles and floating heads without disconnecting the vapor nozzles from the stationary head.

10. Heat exchange apparatus comprising a tube supporting member, banks of heat exchange tubing connected to the member, means associated with the member for providing circulation of liquid through the tubing, a vapor nozzle ring surrounding the tubing above the member and detachably connected therewith, a shell closure surrounding the tubing and detachably connected with the nozzle ring, and a vapor-directing partition capable of removal lengthwise of the tube banks and providing more than one vapor pass.

CHARLES H. LEACH.